United States Patent [19]

Lange

[11] 4,106,041
[45] Aug. 8, 1978

[54] FILM-TRANSPORT AND SHUTTER-CONTROL SYSTEM FOR CAMERAS

[75] Inventor: Karl Heinz Lange, Bünde, Fed. Rep. of Germany

[73] Assignee: Balda-Werke Photographische Gerate Und Kunststoff GmbH & Co., KG., Fed. Rep. of Germany

[21] Appl. No.: 740,268

[22] Filed: Nov. 9, 1976

[30] Foreign Application Priority Data

Nov. 28, 1975 [DE] Fed. Rep. of Germany ....... 2553501

[51] Int. Cl.² ............................................. G03B 17/42
[52] U.S. Cl. ................................... 354/206; 354/204
[58] Field of Search ......................... 354/204, 206, 213

[56] References Cited

U.S. PATENT DOCUMENTS

| 3,810,219 | 5/1974 | Fauth | 354/206 |
| 3,882,515 | 5/1975 | Mueller | 354/204 X |

FOREIGN PATENT DOCUMENTS

1,391,463  4/1975  United Kingdom ..................... 354/213

Primary Examiner—John Gonzales
Attorney, Agent, or Firm—Blum, Moscovitz, Friedman & Kaplan

[57] ABSTRACT

A camera which has a shutter-control structure for cocking and releasing a camera shutter and a film-transporting structure for transporting film is provided with a drive for driving both the shutter-control structure and the film-transporting structure. A drive-control is provided for controlling this drive in such a way that when it is operated first the shutter-control is operated to cock a shutter of the camera, while no drive is transmitted to the film-transporting structure, and then when the shutter is cocked by the shutter-control structure, the drive to the latter is terminated while during the continued operation of the drive, the drive therefrom is transmitted to the film-transport structure.

9 Claims, 7 Drawing Figures

FILM-TRANSPORT AND SHUTTER-CONTROL SYSTEM FOR CAMERAS

BACKGROUND OF THE INVENTION

The present invention relates to cameras.

In particular, the present invention relates to film-transporting and shutter-controlling structures for cameras.

The present invention is particularly applicable to cameras where the film is provided with a single perforation for each film frame and where a differential drive is provided for transmitting a drive both to the structure which transports the film and to the structure which cocks the shutter.

It is in general conventional in photographic cameras to provide a drive which is common to the film-transporting and shutter-cocking structure. However, during take-up of the exposed film, when the latter is wound on a take-up spool, the diameter of the film wound on the latter increases with the result that the angle through which the take-up spool must be turned diminishes during build-up of the take-up spool, in order to transport the film from one frame to the next, and as a result the angular increment of the drive to the take-up spool for transporting the film diminishes during winding of exposed film on the take-up spool.

On the other hand, in order to cock the shutter it is essential to provide at all times a turning angle which remains constant.

A conventional solution to the above problem resides in compensating for the difference between the required turning angles by way of a suitable friction clutch which is situated at a suitable location. A further possibility resides in actuating the driven elements in two phases, according to which in the first actuation phase a drive of a given constant increment is provided in all cases, this drive during the first phase serving on the one hand to cock the shutter and on the other hand to transport the film through a given constant distance. During the second phase of the operation with such a construction, after the shutter has been cocked there remains only a suitable further film-transport to transport the film through the required distance. This second phase of the operation thus becomes correspondingly smaller as result of the fact that the required angle of turning of the take-up spool becomes smaller as the film builds thereon.

A further possibility resides in providing, instead of a friction clutch, a clutch which can be engaged and disengaged.

A further disadvantage of the known solutions involving the use of a friction clutch resides in the fact that with such a solution it is necessary to provide a greater amount of energy than with a solution to the problem involving the use of a differential drive. However, when using known differential drives there is the disadvantage that the shutter-cocking and film-transporting operations cannot be precisely determined. The time required for the parts to move during such operations depends upon the frictional relationships between the moving components which are required to be actuated in the camera. This factor is a disadvantage inasmuch as separation of the drives to the film-transporting structure and shutter-cocking structure is, for example, necessary so that it is possible to operate the shutter independently of the film-transport. Such a problem occurs, for example, when making a double exposure.

SUMMARY OF THE INVENTION

It is accordingly a primary object of the present invention to provide a construction which will avoid the above problems in a manner different from and superior to the solutions already known in the art.

In particular, it is an object of the present invention to provide a construction according to which it becomes possible to operate a drive in such a way that first the shutter is cocked and only thereafter is the film transported, during the continued operation of the drive. Thus, in contrast with the known solutions, according to the solution of the invention there is no transportation of film while the shutter is first cocked, and only after cocking of the shutter is the film transported during the continued operation of the driving structure. Thus, according to the invention the required operations for cocking the shutter and transporting the film take place sequentially one after the other.

Such a sequential operation of the shutter-cocking structure and the film-transporting structure need not necessarily require a longer operating time for cocking the shutter and transporting the film. It is possible, in accordance with a further object of the invention, to make the driving operations for cocking the shutter shorter than with a solution according to which in the first phase of the operation the film is transported simultaneously with the cocking of the shutter.

Moreover, as contrasted with the known solutions, the smaller amount of power required for starting the operation according to the invention can be compensated for by a shortening of the extent of movement of the parts required for cocking the shutter, so that in this way even though the film transport takes place sequentially after cocking of the shutter, there is essentially only the same amount of power required as with conventional constructions.

Thus, it is an object of the present invention to provide a construction for cocking a camera shutter and transporting film in a camera, as set forth above, in such a way that both operating phases take place sequentially one after the other, but in a precisely and accurately determined manner which is constantly capable of being accurately reproduced.

Thus, according to the present invention first the shutter cocking operations take place and immediately thereafter, upon ending of the shutter cocking operation, the film-transporting operations immediately follow.

According to the invention the camera has a shutter-control means supported by a support means for movement between a pair of end positions one of which is a release end position where a shutter is released and the other of which is a cocked end position where the shutter is cocked. The camera also has a film-transporting means for transporting film. A drive means is provided for driving both the shutter-control means and the film-transporting means, this drive means cooperating with the shutter-control means to drive the latter from the release end position to the cocked end position thereof, so that during this latter operation the shutter is cocked. According to the invention a drive-control means cooperates with the drive means to control the latter so that when the drive means operates first the drive is transmitted to the shutter-control means to displace the latter from its release end position to its cocked end position, while there is no transmission of drive to the film-transporting means, and only after the shutter-control means reaches its cocked end position is the drive automatically then transmitted to the film-transporting means to transport film, while a transmission of drive to the shutter-control means is terminated.

BRIEF DESCRIPTION OF DRAWINGS

The invention is illustrated by way of example in the accompanying drawings which form part of this application and in which.

DESCRIPTION OF PREFERRED EMBODIMENTS

Figure 1:
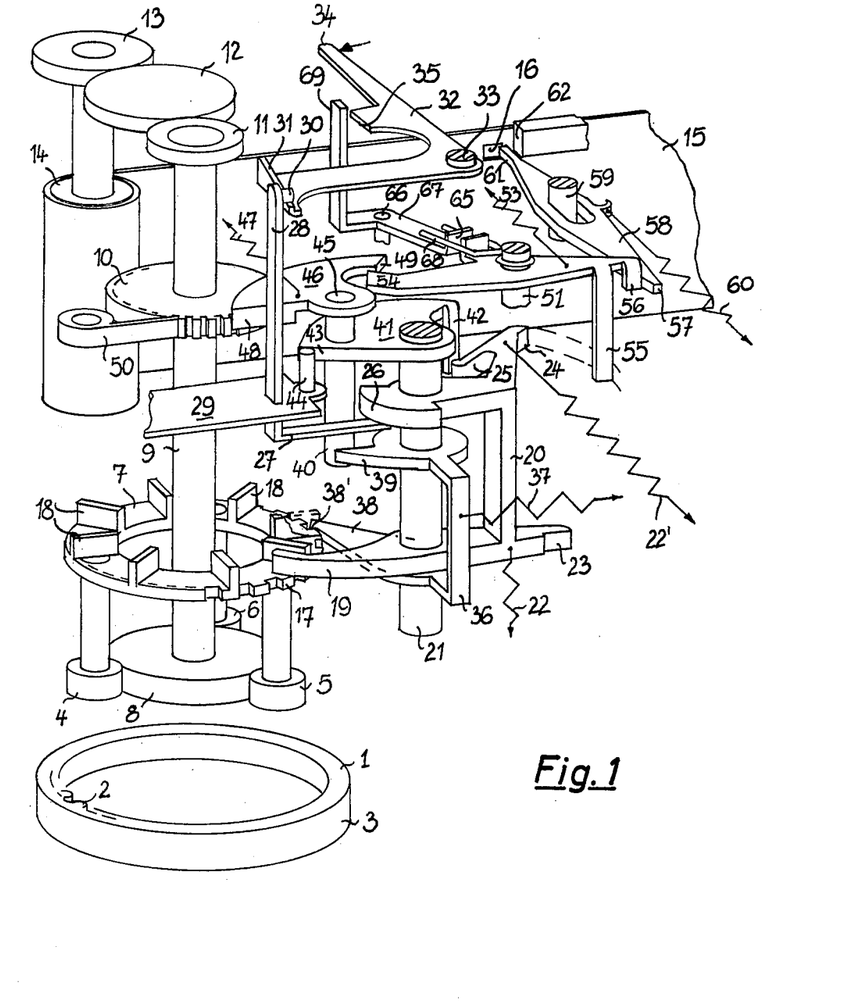
FIG. 1 is a fragmentary perspective partly exploded view of a structure according to the present invention shown with the parts in the positions they take when the shutter has been cocked and the film has been transported, so that the camera is ready to make an exposure.

Referring now to FIG. 1, the structure illustrated therein includes a drive means for driving both a shutter-control means as well as a film-transporting means. This drive means includes a rotary ring 1 having inner teeth 2 as well as an exterior portion 3 which may be knurled so that the ring 1 can be conveniently turned but which may also be provided at the exterior periphery 3 with teeth capable of meshing with a shiftable rack, for example, which is not illustrated, so that in this way the operator can turn the ring 1 for operating the drive means. Thus, an unillustrated rack which meshes with teeth at the exterior 3 of the ring 1 may have an extension forming a handle accessible to the operator for permitting the operator to operate the drive means.

The ring 1 forms part of a differential drive in the form of a planetary gear transmission, and the inner teeth 2 of the ring 1 mesh with a plurality of planetary gears 4-6. The planetary gear transmission preferably includes at least three planetary wheels 4-6. These planetary gears serve at the same time to guide and center the ring 1. The planetary gears are supported for rotary movement by a rotary carrier means 7 and they mesh with a sun gear 8.

The sun gear 8 is fixed to a rotary shaft 9 which in turn fixedly carries a ratchet wheel 10 as well as a second gear 11. This second gear 11 drives through the gear train 12, 13 the take-up spool 14 so that through the gears 11-13 it is possible to rotate the spool 14 to take up thereon exposed film 15, this film 15 being of the type which has a perforation 16 for each film frame. The rotary carrier means 7 which supports the planetary gears 4-6 is concentric with the shaft 9 and is supported for rotary movement about the axis of the shaft 9 in an unillustrated manner. This rotary carrier means 7 is provided at its outer periphery with ratchet teeth 17 forming part of a drive-control means. Also, the rotary carrier means 7 fixedly carries a plurality of motion-transmitting teeth 18 which project upwardly from the carrier means 7 and which are uniformly distributed about the axis thereof, as illustrated in FIG. 1.

The illustrated structure includes a shutter-control means in the form of a lever means 20 having an arm 19 which cooperates with the motion-transmitting projections 18. The lever means or shutter-control means 20 is of a substantially U-shaped configuration and is supported for swinging movement by a support means formed by the shaft 21, so that the shutter-control means 20 is turnable about the axis of the shaft 21 between a pair of end positions one of which is a release end position where the shutter is released and the other of which is a cocked end position where the shutter is cocked, the shutter being cocked by movement of the lever means 20 from the release end position to the cocked end position thereof. In addition the support means formed by the shaft 21 supports the shutter-control means 20 for movement along the axis of the shaft 21. As is schematically shown in FIG. 1, the lever means 20 is acted upon by a pair of springs 22 and 22' which respectively urge the lever 20 in the directions indicated by the arrows of these schematically illustrated springs. In addition, the lever means 20 includes an end portion 23 which serves to control and actuate the unillustrated shutter. The shutter is conventional and is cocked in a known way when the shutter-control means 20 turns about the axis of the shaft 21 in opposition to force of the spring 22' to the illustrated cocked end position of the shutter-control means 20. When released to the force of the spring 22', the lever means 20 is driven by the spring 22' from the illustrated cocked end position thereof to a release end position where the portion 23 trips the shutter to release the same and make an exposure.

As was indicated above the ratchet teeth 17 form part of a drive-control means for controlling the transmission of the drive from the drive means to the shutter-control means and to the film-transporting means, and this drive-control means includes a second substantially U-shaped lever 36 which is supported only for turning movement by the shaft 21 which forms the support means, the lever 36 being acted upon by the spring 37 which acts in the direction indicated by the arrow in FIG. 1. The lever 36 has an arm 38 terminating in a tooth 38' which cooperates with the teeth 17, so that arm 38 and tooth 38' form a pawl cooperating with the ratchet teeth 17. While the arm 38 is situated beneath the lever means 20, this lever means 20 extends above the lever 36. Over the lever 36 the lever means 20 has an arm 24 provided with an extension 25 which is made of a springy yieldable material so that this extension 25 acts as a spring. The arm 24 has a portion 26 which extends over an extension 27 of a vertically movable bar 28 which forms part of the shutter-release means. This bar 28 is guided for movement through an opening formed in a stationary wall 29 which forms part of the support means. Adjacent its upper end the bar 28 carries a pin 30 which cooperates with a cam 31 of a shutter-release lever 32 which is accessible to the operator. The support means includes in addition to the shaft 21 and the stationary plate 29 a stationary pin 33 which supports the lever 32 for movement about the vertical axis of the pin 33. The lever 32 has a free end region 34 which is accessible to the operator. Also the lever 32 has a stop edge 35 for a purpose referred to below.

Figure 5:
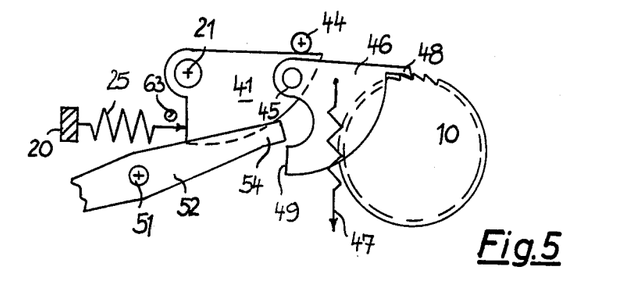
FIGS. 5-7 schematically illustrate different phases of operation, respectively, of the part of the drive-control means which controls the transmission of the drive to the film-transporting means.
Figure 6:
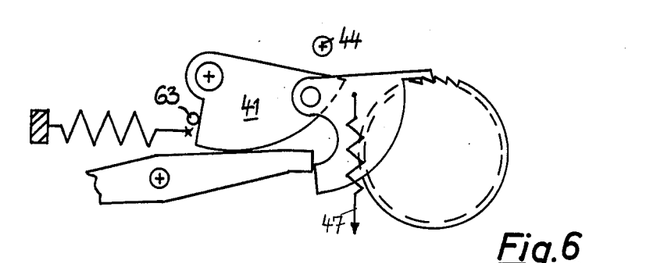
Figure 7:
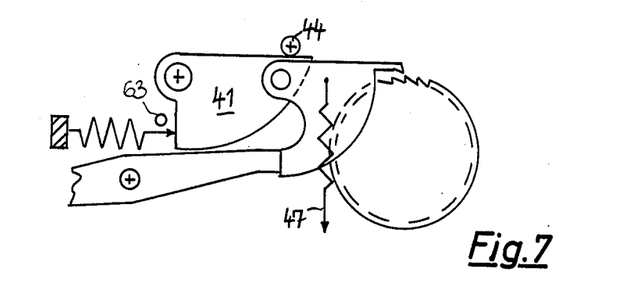

Just beneath the portion 26 of the lever means 20, the second U-shaped lever 36 has a projection 39 which cooperates in the manner described below with a pin 40 of a toggle-linkage means which is illustrated in FIGS. 5–7 and which forms part of the drive-control means. This toggle-linkage means includes a toggle lever 41 of substantially sector-shaped configuration which is supported for turning movement by the shaft 21 of the support means. Thus the levers 20, 36, and 41 all have a common turning axis. The toggle lever 41 has an extension 42 with which the springy portion 25 of the arm 24 cooperates in a manner described below. This toggle lever 41 has an edge 43 which is urged by the springy portion 25 into engagement with a stationary stop means formed by the pin 44 which is fixedly carried by the stationary plate 29 of the support means.

The pin 40 of the toggle-linkage means has an upper end region 45 serving to pivotally connect to the toggle lever 41 a second toggle lever 46. A spring 47 is connected to the toggle lever 46 so as to urge the latter in the direction indicated by the arrow of the spring 47 in FIG. 1. It will be seen that the springs 47 and 25 as well as the directions in which they operate are schematically indicated in FIGS. 5–7. This second toggle lever 46 has a pawl portion 48 which cooperates with ratchet teeth of the ratchet wheel 10 fixedly carried by the rotary shaft 9. In addition, the toggle lever 46 has a control end surface 49 for a purpose referred to below. A leaf spring 50 cooperates with the ratchet wheel 10 so as to limit the latter to only one direction of rotation.

The drive-control means in addition to including the above-described toggle-linkage means as well as the lever 36 and the ratchet teeth 17 includes also a swingable control lever 52 supported for turning movement about the vertical axis of a stationary pin 51 which also forms part of the support means. A spring 53 acts on the control lever 52 so as to urge the latter in the direction indicated by the arrow of the spring 53. This control lever 52 terminates in the region of the control end surface 49 of the toggle lever 46 in an end region 54 adapted to cooperate with the surface 49 in a manner described below. This control lever 52 further includes a projection 55 situated in the path of turning of the arm 24 of the shutter-control means 20. Also the control lever 52 has a projection 56 which cooperates with an end 57 of a film-sensing lever means 58. This film-sensing lever means 58 is supported by a stationary pin 59 of the support means both for turning movement about the pin 59 as well as for longitudinal movement with respect thereto, the film-sensing lever 58 being provided with an elongated slot for this purpose. Thus the pin 59 extends through the slot so as to guide the lever 58 for turning movement as well as for longitudinal movement, this lever 58 being supported for turning and longitudinal movement as by a collar which is not illustrated and which is fixed to the pin 59 just beneath the lever 58. A spring 60 acts on the film-sensing lever 58 to urge the latter in the direction indicated by the arrow of the spring 60.

The film-sensing lever means 58 terminates distant from its end 57 in an elongated portion 61 which senses the presence or absence of a perforation 16 of the film 15. This end 61 is guided by a stationary guide member 62 during certain phases of operation of the lever 58. This part 62 forms part of the camera housing.

The control lever 52 has furthermore a projection 64 fixed to a double-acting spring 68 intermediate the ends of the latter. This spring 68 has a pair of springy arms extending from the projection 64 and receiving between themselves a projection 65 of a lever 67 which is supported for turning movement by a stationary pivot 66. This lever 67 forms a means for blocking operation of the shutter-release lever 32, in a manner described below, so as to prevent double exposures, and for this purpose the lever 67 has an arm 69 which cooperates with the stop edge 35 of the lever 32.

The structure described above operates as follows:

The structure is shown in FIG. 1 in the position taken thereby after the shutter has been cocked and the film has been transported so that the camera is ready to make an exposure. For this purpose the operator will turn the lever 32 at its region 34 in the direction indicated by the arrow in FIG. 1. Thus, the lever 32 is turned about the pin 33 and the cam 31 acts on the pin 30 so as to raise the bar 28. The extension 27 of the bar 28 acts on the portion 26 of the shutter-control means 20 to displace the latter along the axis of the shaft 21 in opposition to the spring 22. Thus, the lever 20 will move upwardly along the shaft 21, as viewed in FIG. 1, until the arm 19 of the lever 20 moves upwardly beyond the particular motion-transmitting projection 18 which engages the arm 19 in the position of the parts shown in FIG. 1. As soon as the arm 19 clears the particular motion-transmitting projection 18, the spring 22' swings the lever 20 about the shaft 21. Thus, the spring 22' now drives the lever 20 from the illustrated cocked end position thereof to the release end position thereof where the portion 23 of the lever 20 trips the shutter to make the exposure. Instead of separate springs 22 and 22' it is of course possible also to provide a single spring which will perform the functions of both of the springs 22 and 22'.

As the lever 20 approaches and is in the region of its release end position, the arm 24 of the lever 20 engages the projection 55 of the control lever 52 and turns the latter in opposition to the spring 53 through a distance sufficient to situate the projection 56 of the control lever 52 just beyond the end 57 of the film-sensing lever 58 so that the spring 60 can now turn the lever 58 to situate the end 57 in line with the projection 56 of the control lever 52. Moreover, this turning of the lever 52 displaces the right arm of the double-acting spring 68, as viewed in the drawings, away from the projection 65 and presses on the projection 65 with the left arm so as to exert on the lever 67 a force which will subsequently turn the lever 67 to a position where the portion 69 thereof will prevent a double exposure from being made. Inasmuch as the lever 32 is still pressed by the operator to the position indicated in FIG. 2, the lever 67 initially cannot yet turn to the blocking position thereof where the portion 69 of the lever 67 will be situated in the path of turning of the edge 35 of the lever 32. However, when the operator releases the lever 32 it will automatically return, under the action of an unillustrated spring, for example, to its initial position and then the double-acting spring 68 will act on the lever 67 to situate the arm 69 in the path of movement of the edge 35, this action being brought about by the turning of the control lever 52 to the position shown in FIG. 2 by the arm 24 of the shutter-control means 20.

Figure 2:
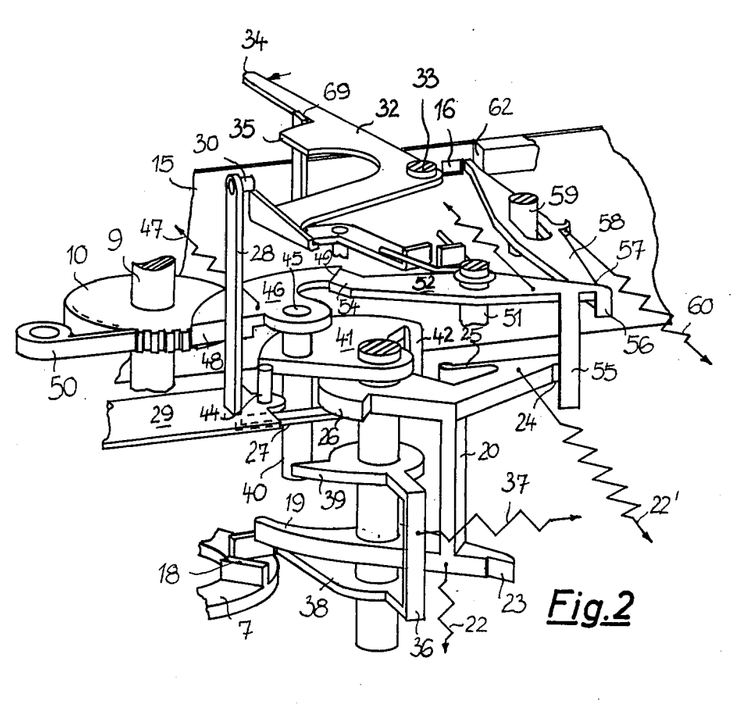
FIG. 2 shows part of the structure of FIG. 1 in the position taken by this structure after the shutter has been tripped but while the shutter-release member is still depressed by the operator.

Moreover, at the beginning of the turning of the lever means 20 from the cocked end position thereof shown in FIG. 1, to the release end position thereof shown in FIG. 2, the springy portion 25 of the lever 20 moves away from the portion 42 of the toggle lever 41 so that the spring 47 is now free to turn the lever 46 and through the pin 40 the lever 41 so as to displace the edge 43 of the latter away from the stop pin 44. This action is possible because the point engagement of the pawl portion 48 with the ratchet 10, the pin 40, and the shaft 21 are situated substantially along a straight line. As may be seen from FIGS. 5 and 6, the result of the movement of the springy portion 25 away from the portion 42 of toggle lever 41 is that the spring 47 turns the toggle linkage means from the position of FIG. 5 to the position of FIG. 6, this turning being limited by engagement of an edge of the toggle lever 41 with a stationary stop pin 63 which is shown only in FIGS. 5-7. Moreover, as is apparent from a comparison of FIGS. 5 and 6, the path of movement of the pin 40, including the upper end region 45 thereof, is quite small, and in spite of this movement the pawl portion 48 of the toggle lever 46 remains in engagement with the ratchet 10 which is fixed to the shaft 9, so that the ratchet 10 cannot turn and the drive cannot be transmitted through the shaft 9 and the gear train 11-13 to the take-up spool 14, so that the film-transporting means is prevented from operating even though the toggle linkage moves from the position of FIG. 5 to the position of FIG. 6. Thus, during this movement the pawl 48 remains in engagement with the ratchet 10.

The above-described movement of the toggle-linkage means from the position of FIG. 5 to that of FIG. 6 also results in displacement of the control end surface 49 of the toggle lever 46. This movement of the lever 46 places the control end surface 49 in a position for cooperation with the end portion 54 of the control lever 52. Thus, with the turning of the lever 46 from the position of FIG. 5 to that of FIG. 6, the surface 49 has been displaced to a position where the end 54 can become situated in front of and directly next to the surface 49. Thus, when the lever 20 starts to turn from the position of FIG. 1 to the position of FIG. 2, the springy portion 25 moves away from the lever 41 so that the spring 47 can displace the toggle-linkage means from the position of FIG. 5 to that of FIG. 6, and then when the arm 24 engages the portion 55 of the lever 52, the end portion 54 thereof is turned to become situated in front of the directly next to the surface 49.

In this way the parts assumed the position shown in FIG. 2. Upon release of the lever 32, as pointed out above, this lever returns to its initial position and the double-acting spring 68 turns the lever 67 to the position where the portion 69 thereof becomes situated in front of the edge 35 to prevent a second actuation of the lever 32. Now the camera is in a position where a film frame has been exposed, so that the camera is ready to have the shutter cocked and the film transported to situate the next frame in a position for exposure. However, at this time, as pointed out above, turning of the ratchet wheel 10 is prevented so that the film-transporting means 9-13 cannot turn the take-up spool 14.

Now, in order to ready the camera for the next exposure, the operator will turn the ring 1 in the manner described above. The inner teeth 2 of the ring 1 will act on the planetary gears 4-6 to cause them to ride around the sun gear 8 which is maintained stationary by cooperation of the pawl portion 48 of the lever 46 with the ratchet wheel 10. Of course, upon return of the lever 32 to its initial position, the cam 31 becomes displaced with respect to the pin 30 so that the bar 28 can move down and the lever 20 also moves downwardly along the axis of the shaft 21. Thus, the arm 19 is now situated in the path of movement of the next motion-transmitting projection 18 of the rotary carrier means 7. Therefore, at this time the turning of the ring 1 will result in planetating the gears 4-6 around the stationary sun gear 8 with consequent rotary movement of the carrier means 7 so that a motion-transmitting projection 18 thereof will engage the arm 19 of the lever 20 and turn the latter in opposition to the spring 22' from the release end position toward the cocked end position. During this time the shutter is cocked in a well known manner by the action of the portion 23 of the lever 20. At this time the rotary carrier means 7 will turn in a clockwise direction, as viewed from above in FIG. 1, and the ratchet teeth 17 are such that they are capable of moving in this direction past the tooth 38' of the pawl 38 so that the pawl 38 is turned in opposition to the spring 37 causing the tooth 38' to become situated at the outer surface region of a tooth 17 and thus causing the projection 39 of the lever 36 to turn toward the pin 40 of the toggle linkage means, this pin 40 now being in the position shown in FIG. 6 as described above. Since the lever 20 has now almost reached its cocked end position, the springy portion 25 thereof engages the portion 42 of the toggle lever 41 and seeks to turn the latter back into engagement with the stop pin 44. However, this return movement of the toggle linkage is prevented by engagement of the projection 39 with the pin 40 while the tooth 38' is at an outer surface region of a tooth 17. Thus the springy portion 25 is deflected while seeking to turn the lever 41 with this turning being prevented by engagement of the pin 40 with the projection 39 at this particular part of the operation.

However, during the continued turning of the rotary carrier means 7, the particular tooth 17 which holds the projection 39 in engagement with the pin 40 turns beyond the tooth 38' of the pawl arm 38, and now the spring 37 is free to turn the lever 36 so that the tooth 38' will enter into the gap between the above tooth 17 and the next tooth 17, with the result that the projection 39 turns to permit the pin 40 to move so that the lever 41 can have its edge 43 displaced by the springy portion 25 into engagement with the stop 44. In this way it is possible for the toggle lever 41 to turn to the initial position thereof which is shown in FIG. 7. Thus it will be noted that in FIGS. 5 and 7 the toggle lever 41 has the same position engaging the stop means 44.

Figure 3:
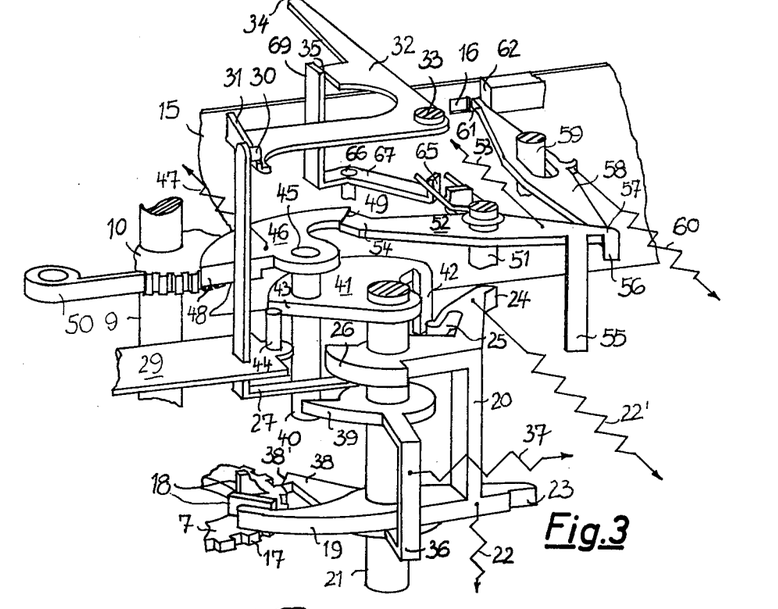
FIG. 3 illustrates the position taken by part of the structure of FIG. 1 at the end of a shutter-cocking operation just before transmission of the drive to the film-transporting means.
Figure 4:
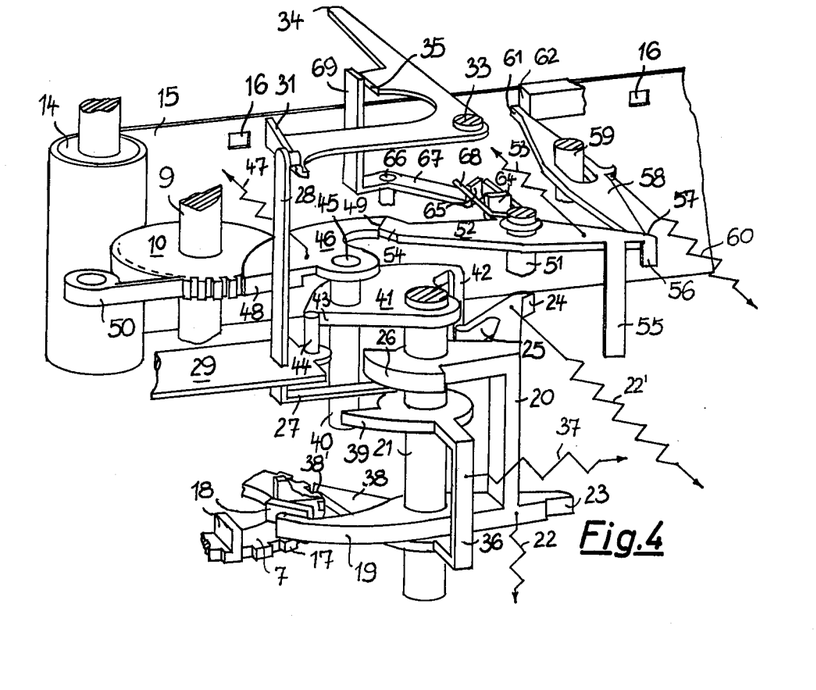
FIG. 4 shows the parts at a further stage where the film is being transported.

The parts are shown in FIG. 3 in the position just before the tooth 38' has entered into the gap between the next pair of teeth 17 so that the edge 43 of lever 41 can be displaced by the springy portion 25 into engagement with the pin 44, and it will be noted that at this time the arm 24 has moved away from the projection 55 of the lever 52 so that the spring 53 is now free to urge the control lever 52 back toward its initial position. However, the spring 53 cannot at this time return the lever 52 to its initial position inasmuch as the projection 56 still engages the end 57 of the film-sensing lever 58. Since the spring 53 is stronger than the spring 60, the end 61 of the lever 58 engages the surface of the film 15 which prevents the lever 58 from moving longitudinally with respect to the pin 59 through a distance sufficient to permit the lever 52 to be returned to its initial position by the spring 53. As a result the end region 54 of the control lever 52 remains in line with the control end surface 49 of the toggle lever 46. As a result when the tooth 38' enters into the gap between the next pair of teeth 17 so that the projection 39 releases the pin 40 and the springy portion 25 of lever 20 turns lever 41 so that its edge 43 engages stop 44, the toggle lever 46 is displaced from the position of FIG. 6 to the position of FIG. 7 where the pawl 48 is displaced from the teeth of the ratchet 10. Thus, simultaneously with the movement of the tooth 38' into the gap between the next pair of teeth 17, the shutter-control means 20 reaches its cocked end position and the drive-control means cooperates with the drive means to permit the drive to be transmitted therefrom to the film-transporting means while at the same time the transmission of drive to the shutter-control means 20 is terminated by cooperation of the pawl 38 with the teeth 17 of the rotary carrier means 7 which now is prevented from turning further so that the transmission of the drive to the shutter-control means 20 terminates while the continued rotation of the ring 1 will during the continued operation of the drive means result in transmission of the drive to the film-transporting means 9–13. Thus the shutter-control means 20 is secured in its cocked end position while the drive is transmitted to the film-transporting means.

At this point of the operation it is well to refer to a further function of the structure of the invention, namely the function which takes place when there is no film in the camera. In this event the end region 61 of the film-sensing lever means 58 of course will not engage any film since there is no film in the camera. Instead the spring 53 can act to turn the lever 52 so as to cause the projection 56 to displace the lever 58 longitudinally along the entire length of the slot thereof until the opposite end of the slot reaches the pin 59. In this way the lever 58 can be displaced at this time to its opposite end position, which is to say the end position opposite to that determined by the spring 60 in the position of the parts shown in FIG. 1. This operation is of course possible because the spring 53 is stronger than the spring 60, as pointed out above. The result of this extent of turning of the lever 52 is that the end region 54 thereof has turned beyond the control end surface 49 of the toggle lever 46 so that instead of the parts assuming the position shown in FIG. 7 where the ratchet 10 is released, the toggle linkage means snaps back to the position of FIG. 5 from the position of FIG. 6, without releasing the film-transporting means so that the drive cannot be transmitted thereto. Therefore, the camera is now ready to have its shutter again released, as is in fact desirable for demonstration purposes without film in the camera. To achieve this result it is required that the slot of the lever 58 be made sufficiently long so that the end 61 of the film-sensing lever 58 can enter into the film-cassette chamber through an appreciable distance greater than the case where the end 61 of the lever 58 simply is received in a perforation 16 of the film.

Thus, with such a construction it is possible to provide an operation according to which the structure of the invention distinguishes between the operations which take place when a film cassette is in the camera and when a film cassette is not in the camera.

Assuming now that a film cassette is in the camera so that the film 15 is situated therein as shown in the drawings, then the ratchet 10 will be released as shown in FIG. 7, as a result of the cooperation between the region 54 of control lever 52 and control surface 49 of toggle lever 46, and thus the drive is transmitted to the film-transporting means. This drive is at this time transmitted to the film-transporting means inasmuch as the rotary carrier means 7 is maintained stationary so that the continued turning of the ring 1 will result in rotation of the planetary gears 4–6 respectively about their axes which now remain stationary, so that the sun gear 8 is rotated. Of course the shutter-control means 20 remains held in its shutter-cocked position at this time as pointed out above. This rotation of the sun gear 8 in a direction opposite to the direction of rotation of the ring 1 now transmits the drive through the film-transporting means 9–13 to the spool 14 so as to take up the exposed film. As a result the next perforation 16 of the film 15 will approach the end 61 of the film-sensing lever 58. When this next perforation 16 reaches the lever 58, the end 61 thereof enters into this next perforation 16, but the film-transporting operation still continues inasmuch as, as pointed out above, the extent of movement of the lever 58 at this time is limited by the cassette itself so that the lever 58 cannot at this time move through a distance sufficient to permit the end 54 of control lever 52 to be turned beyond the control surface 49 of toggle lever 46. This extent of movement of the lever 58 is of course in contrast to the above situation where there is no cassette in the camera.

During the continued transportation of the film at this time, the film itself will act on the lever 58 to turn the latter about the pin 59 as a result of the receiving of the end 61 of the lever 58 in the film perforation 16. When the next film frame which is to be exposed has reached the proper position for exposure, the end 57 of the lever 58 has been turned by the moving film just beyond the portion 56 of the lever 52. Thus, it will be seen that the instant when the end 57 of lever 58 moves beyond the portion 56 of lever 52 is determined by the movement of a film perforation 16 to a given location, and not by the extent of turning of the spool 14. As the film builds on the latter, the extent of turning will continuously diminish in order to displace the next perforation 16 to the predetermined location, and it is this latter movement of the perforation 16 to the predetermined location which determines when the end 57 of lever 58 turns beyond portion 56 of lever 52 to release the latter to the spring 53. At this instant the spring 53 will turn the lever 52 so as to move the portion 54 thereof beyond the control surface 49 of lever 46, so that now the spring 47 can turn the lever 46 about the pivot 40 so as to place the pawl 48 again in engagement with the ratchet 10 and thus terminate the film-transporting operation. Of course, the movement of the end 57 of lever 58 beyond the portion 56 of lever 52 enables the spring 60 to pull the film-sensing lever 58 out of the film perforation. Moreover, the return of the control lever 52 back to its initial position causes the double-acting spring 68 to return the lever 67 to the position where the portion 69 thereof no longer blocks turning of the lever 32.

Thus, the camera is now ready to make the next exposure.

According to a particularly advantageous embodiment of the invention, the rotary carrier means 7 can be provided at its inner periphery with teeth which are not shown in the drawing, and such inner teeth of the rotary carrier means 7 can cooperate with structure for turning a flash cube, the transmission ratio between the rotary carrier means 7 and the flash-cube operating structure being 1:2, so that the rotary carrier means 7 can have stop-projections which correspond to the four possible angular positions of the flash cube.

In connection with the ring 1, the above-mentioned rack for turning the same is normally urged by a spring away from the teeth at the outer periphery of the ring 1, this spring returning the rack to a starting position when the rack is released by the operator. The rack has a projection engaged by the operator who when operating the rack displaces it into engagement with the teeth at the outer periphery of the ring 1.

It is also possible to provide the ring 1 at its outer periphery with teeth which form part of a one-way driving clutch, these teeth being surrounded by a ring which forms with the teeth tapered gaps in which balls are located to be urged into driving engagement toward the narrower ends of the tapered gaps when the outer ring is turned by the operator in one direction while when the operator releases this outer ring it can be returned by a spring to a starting position turning at this time in the opposite direction where it does not transmit a drive to the ring 1.

What is claimed is:

1. In a camera, shutter-control means and support means supporting said shutter-control means for movement between a pair of end positions one of which is a release end position where said shutter-control means releases a camera shutter and other of which is a cocked end position where a shutter of the camera is cocked and ready to be released, film-transporting means for transporting film, drive means operatively connected with said shutter-control means for driving the latter from said release end position to said cocked end position thereof, said drive means also being operatively connected with said film-transporting means for operating the latter to transport film, and drive-control means operatively connected with said drive means for automatically controlling the latter for first transmitting a drive to said shutter-control means while preventing transmission of a drive to said film-transporting means until said shutter-control means reaches said cocked end position thereof, and for then, during continued unidirectional operation of said drive means, transmitting a drive to said film-transporting means while said shutter-control means remains in said cocked end position thereof without any further transmission of a drive thereto.

2. In a camera, shutter-control means and support means supporting said shutter-control means for movement between a pair of end positions one of which is a release end position where said shutter-control means releases a camera shutter and other of which is a cocked end position where a shutter of the camera is cocked and ready to be released, film-transporting means for transporting film, drive means operatively connected with said shutter-control means for driving the latter from said release end position to said cocked end position thereof, said drive means also being operatively connected with said film-transporting means for operating the latter to transport film, and drive-control means operatively connected with said drive means for automatically controlling the latter for first transmitting a drive to said shutter-control means while preventing transmission of a drive to said film-transporting means until said shutter-control means reaches said cocked end position thereof, and for then, during the continued operation of said drive means, transmitting a drive to said film-transporting means while said shutter-control means remains in said cocked end position thereof without any further transmission of a drive thereto, said drive means being in the form of a differential planetary-gear drive including an inner sun gear, outer planetary gears meshing with said sun gear, and an outer internal ring gear meshing with said planetary gears, said drive means including a rotary carrier means carrying said planetary gears, and said drive-control means including ratchet teeth situated at an outer periphery of said rotary carrier means and a spring-pressed pawl cooperating with said ratchet teeth.

3. The combination of claim 2 and wherein said shutter-control means is in the form of a lever means supported by said support means for turning movement about a predetermined axis between said end positions thereof, said support means also supporting said lever means for movement along said axis, said drive-control means including a toggle-linkage means which includes one toggle lever also supported by said support means for turning movement about said axis and a second toggle lever pivotally connected with said one toggle lever eccentrically with respect to said axis and including a pawl portion, said drive-control means also including a ratchet which cooperates with said pawl portion of said second toggle lever, said rotary carrier means including a plurality of motion-transmitting teeth for transmitting motion to said lever means which forms said shutter-control means when said lever means is in a given position along said axis of said support means, and the latter lever means being movable along said axis beyond the range of operation of said motion-transmitting teeth to be released for movement from said cocked end position to said release end position, said lever means of said shutter-control means having a springy portion engaging said one toggle lever when said lever means is in said cocked end position thereof, and stop means against which said one toggle lever is urged by said springy portion of said lever means.

4. The combination of claim 3 and wherein a shutter-release means is operatively connected with said lever means of said shutter-control means for displacing the latter lever means along said axis beyond the range of said motion-transmitting teeth to free said shutter-control means for movement from said cocked end position thereof to said release end position thereof.

5. In a camera, shutter-control means and support means supporting said shutter-control means for movement between a pair of end positions one of which is a release end position where said shutter-control means releases a camera shutter and other of which is a cocked end position where a shutter of the camera is cocked and ready to be released, film-transporting means for transporting film, drive means operatively connected with said shutter-control means for driving the latter from said release end position to said cocked end position thereof, said drive means also being operatively connected with said film-transporting means for operating the latter to transport film, and drive-control means operatively connected with said drive means for automatically controlling the latter for first transmitting a drive to said shutter-control means while preventing transmission of a drive to said film-transporting means until said shutter-control means reaches said cocked end position thereof, and for then, during the continued operation of said drive means, transmitting a drive to said film-transporting means while said shutter-control means remains in said cocked end position thereof without any further transmission of a drive thereto, film-sensing lever means for cooperating with a perforation of a film strip, said support means supporting said film-sensing lever means for longitudinal movement at a free end portion into a film perforation which reaches said film-sensing lever means during transportation of film by said film-transporting means, and said support means also supporting said film-sensing lever means for turning movement, said drive-control means including a control lever supported by said support means for turning movement and spring means operatively connected with said control lever for urging the latter to turn in a given direction, said control lever having a portion engaging a part of said film-sensing lever means for urging the latter toward a film strip with the force of the latter spring means, so that when said film-sensing lever enters into a film perforation, said control lever is turned by said spring means while said portion of said film-sensing lever means in a perforation of the film strip causes said film-sensing lever means to turn while film continues to be transported until said film-sensing lever means turns beyond said control lever, said control lever while engaging said part of said film-sensing lever means maintaining said drive-control means in a position permitting a drive to be transmitted to said film-transporting means and said drive-control means terminating the transmission of a drive to said film-transporting means when said film-sensing lever means turns beyond said control lever.

6. The combination of claim 3 and wherein said pawl which cooperates with said ratch teeth of said rotary carrier means controls termination of the transmission of the drive to said shutter-control means and start of the transmission of the drive to said film-transporting means, said drive-control means including a swingable control lever supported for turning movement by said support means and having a portion cooperating with said second toggle lever to release said pawl portion thereof from the ratchet cooperating therewith, the latter ratchet controlling the transmission of the drive to said film-transporting means, and said lever means of said shutter-control means engaging said control lever when said lever means approaches said release end position thereof for displacing said control lever to a position for cooperating with said second toggle lever for permitting the drive to be transmitted to said film-transporting means.

7. The combination of claim 6 and wherein a film-sensing lever is supported by said support means for longitudinal movement toward and away from a film strip and for turning movement, said film-sensing lever having a free end adapted to enter a perforation of a film strip to be turned by the film during transportation thereof, said control lever having a portion cooperating with a portion of said film-sensing lever, and said drive-control means including a spring means acting on said control lever to urge said portion thereof against said portion of said film-sensing lever to urge the latter toward a film strip, the film strip itself during transportation thereof turning said film-sensing lever beyond said portion of said control lever to release the latter to be moved by said spring means to a position which releases said second toggle lever to place said pawl portion thereof in cooperation with the ratchet cooperating with the same to terminate the operation of the film-transporting means.

8. The combination of claim 7 and wherein a pivot pin interconnects said toggle levers, said pawl which cooperates with said ratchet teeth of said rotary carrier means fixedly carrying a projection which cooperates with said pivot pin for preventing said one toggle lever from engaging said stop means until the latter pawl is situated in a gap between a pair of successive teeth of said rotary carrier means.

9. The combination of claim 7 and wherein when there is no film in the camera said spring means cooperates with said control lever for acting on said film sensing lever for moving the latter longitudinally through a distance greater than that through which said film-sensing lever moves when film is in the camera, and during such movement said control lever freeing said toggle linkage means to move without releasing the drive to be transmitted to said film-transporting means, so that without film in the camera it is possible to cock and release the shutter without operating the film-transporting means.

* * * * *